No. 736,176. PATENTED AUG. 11, 1903.
H. VANDERBEEK.
MOTOR VEHICLE.
APPLICATION FILED OCT. 27, 1899.
NO MODEL. 3 SHEETS—SHEET 1.
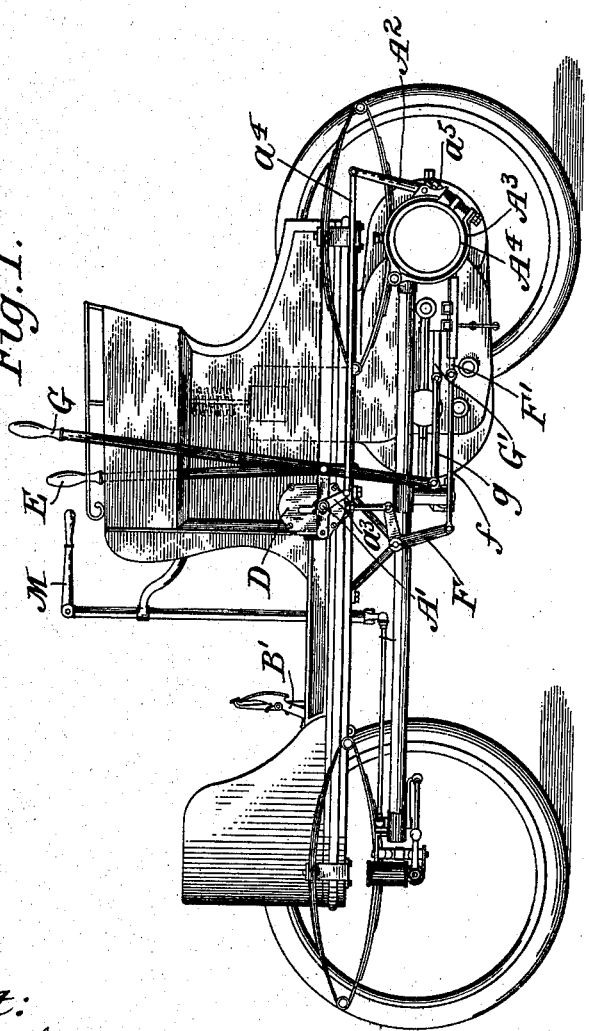
Attest:
A. N. Jestera
L. R. Moore
Inventor:
Herbert Vanderbeek
by Redding, Kiddle & Greeley
Attys

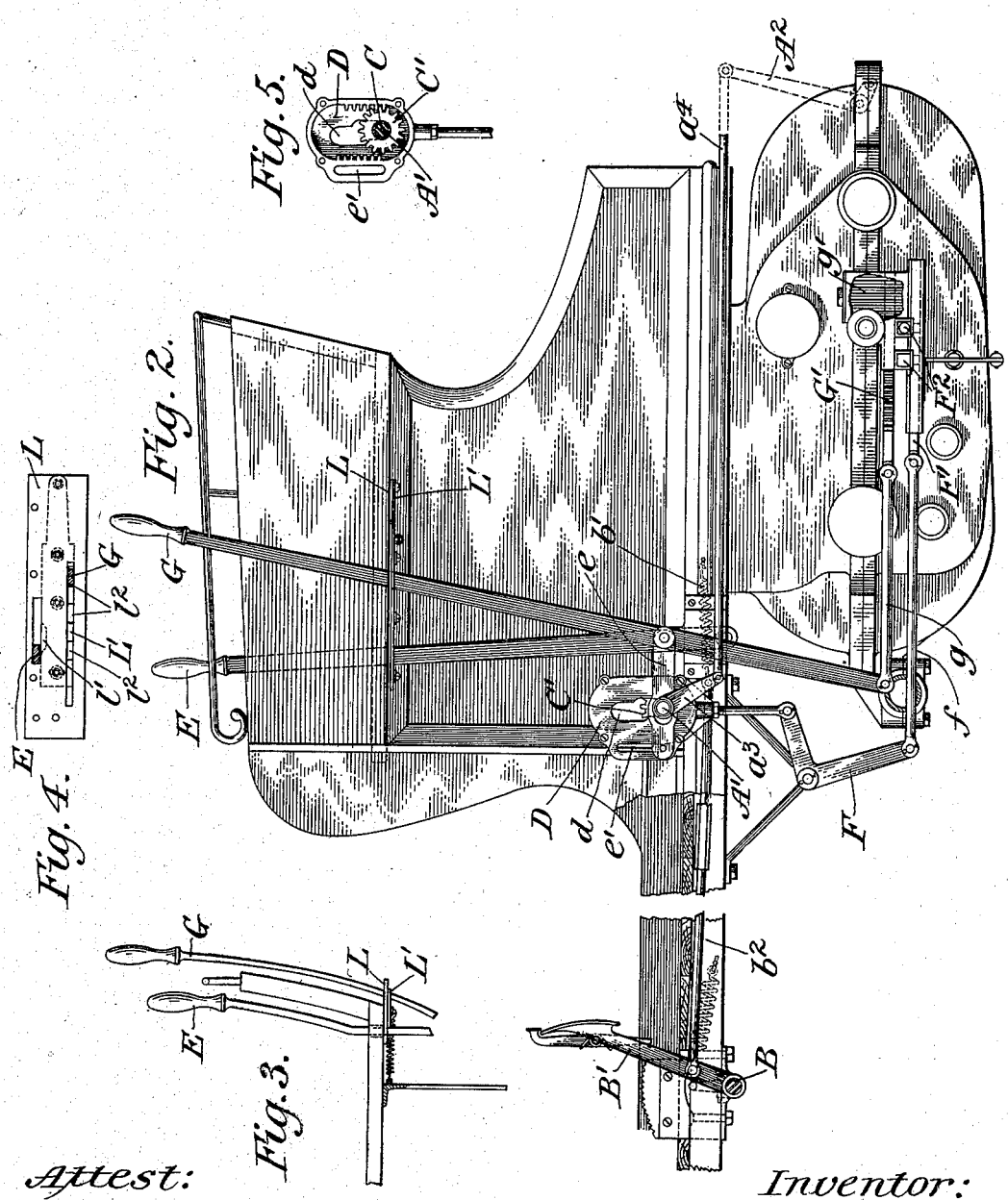

No. 736,176. PATENTED AUG. 11, 1903.
H. VANDERBEEK.
MOTOR VEHICLE.
APPLICATION FILED OCT. 27, 1899.
NO MODEL. 3 SHEETS—SHEET 3.
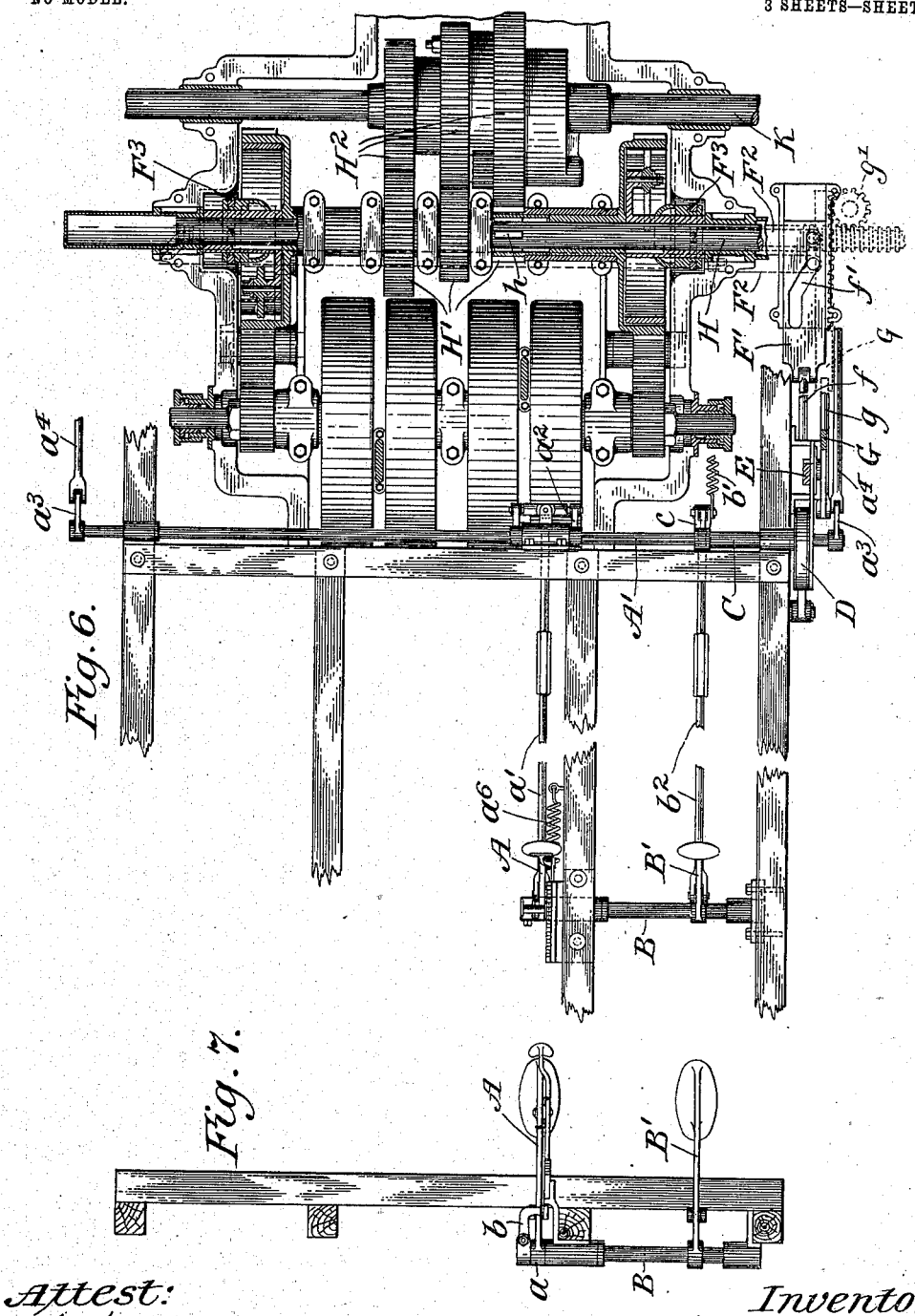
Attest:
A. N. Jesbera
L. R. Moore
Inventor:
Herbert Vanderbeek
by Redding, Kiddle & Greeley
Attys.

No. 736,176. Patented August 11, 1903.

UNITED STATES PATENT OFFICE.

HERBERT VANDERBEEK, OF HARTFORD, CONNECTICUT, ASSIGNOR, BY MESNE ASSIGNMENTS, TO MORTON TRUST COMPANY, TRUSTEE, A CORPORATION OF NEW YORK.

MOTOR-VEHICLE.

SPECIFICATION forming part of Letters Patent No. 736,176, dated August 11, 1903.

Application filed October 27, 1899. Serial No. 734,929. (No model.)

*To all whom it may concern:*

Be it known that I, HERBERT VANDERBEEK, a citizen of the United States, residing in the city of Hartford, county of Hartford, State of Connecticut, have invented certain new and useful Improvements in Motor-Vehicles, of which the following is a specification, reference being had to the accompanying drawings, forming a part hereof.

The invention relates to the construction and arrangement of the devices or mechanism for controlling the speed and direction of movement of the vehicle, and has for its general object not only to promote the convenience of the operator or driver, but more to provide for such an interlocking of the devices or mechanisms referred to as shall prevent the shifting of the speed-changing mechanism or the reversing of the vehicle except when the motor is disconnected from the driving mechanism and shall insure the disconnection of the driving mechanism when the brake is applied.

The invention will be more fully explained hereinafter with reference to the accompanying drawings, in which the several features of the invention are illustrated, and in which—

Figure 1 is a side elevation of a motor-vehicle equipped with a convenient and practical form of the controlling and operating mechanism. Fig. 2 is a partial view of the motor-vehicle shown in Fig. 1, but on a larger scale, so as to show the construction more clearly, the body of the vehicle being partly broken off, so as to save space. Fig. 3 is a detail view in front elevation, showing the relation of the hand-levers and the interlocking devices. Fig. 4 is a plan view of the interlocking devices, with the hand-levers in section. Fig. 5 is a detail view, in side elevation, of the yoke hereinafter referred to, with some of its adjuncts. Fig. 6 is a partial plan view of some of the controlling and actuating devices, with the driving-gear in sectional plan. Fig. 7 is a front elevation of some of the parts shown in Fig. 6.

In order that the relation of the brake-operating devices to the devices for controlling the motor or the connection thereof to the driving-wheels may be understood, reference will first be made to the particular form of brake-actuating devices shown in Figs. 1, 2, 6, and 7, although it will be obvious that any suitable form of brake-actuating devices and of brake may be substituted for the arrangement shown. As represented particularly in Figs. 6 and 7, a brake lever or pedal A is suitably supported upon the body of the vehicle, being shown as secured to a short sleeve $a$, mounted loosely on a short shaft B, carried in suitable bearings. The lever A is connected by a link $a'$ with an arm $a^2$ on a transverse shaft A', which is interposed merely for convenience in the application of separate brakes on opposite sides of the vehicle. Other arms $a^3$ on the shaft A' are connected by links $a^4$ with the brake-operating bell-crank levers $A^2$. The construction of the brakes is not material to the present invention; but, as shown in the drawings, each bell-crank $A^2$ is mounted upon one free end of the brake strap or band $A^3$ and is connected by a link $a^5$ with the other free end of said band, so that a movement of the bell-crank tightens the brake-band upon a brake-drum $A^4$, which may be secured to the hub of the adjacent driving-wheel of the vehicle.

The short shaft B, above referred to, has fixed thereto the clutch-operating lever or pedal B', which is adapted to be operated by the pressure of the foot thereon through connections such as are described hereinafter to open or close the clutch, which is interposed between the motor and the driving-shaft of the vehicle. As indicated hereinbefore, the brake-actuating devices are so related to the mechanism for controlling the motor or its connection to the driving-shaft that the application of the brake shall of itself release the clutch, whereby the disengagement of the motor shall be effected in all cases before or as soon as the brake is applied. It is also desirable to establish such a relation that the clutch-controlling devices can be operated without setting the brake. As a convenient means of establishing such relation the sleeve $a$ of the brake-lever A is mounted, as already described, upon the clutch-shaft B, and an arm $b$ on the latter is so disposed with relation to the brake-lever A that the movement of the latter to apply or set the brake will effect an operative movement of the shaft B and of the lever B', carried thereby, while at the same time the clutch-lever can be moved without actuating the brake-lever, it being evident that the lever A may be so adjusted upon shaft B to permit a limited movement of said lever A before it engages the arm B in order to effect the proper movement of the braking mechanism with respect to the clutching mechanism. A spring $a^6$ may be applied to the lever A to restore the same after operation, and a spring $b'$ may be connected either directly or indirectly to restore the clutch-lever B' and the parts operated thereby to initial position after operation or release.

In the arrangement shown in the drawings, which are intended to illustrate a device suitable for the purpose, the clutch-lever B' is connected by a link $b^2$ with an arm $c$, fixed for convenience to a sleeve C, mounted loosely on the shaft A', above referred to. Said sleeve carries a pinion C', adapted for engagement with either side of a double or mangle rack or yoke D to impart thereto a vertical movement in one direction or the other, according to the engagement of the pinion with the yoke, it being understood that the partial rotation of the pinion is effected through some such connections as those already described by the movement of the clutch-lever B'. It will be observed that the plate which carries the two racks of the yoke D is slotted, as at $d$, to travel on the sleeve C, fitting the same closely at its two end portions, but being wide enough at its middle portion only to permit of a sufficient lateral movement of the yoke to disengage one rack from the pinion and to engage the other therewith, the pinion being between the two relative positions just indicated in engagement with both racks, so that while that relation obtains there can be no movement of the yoke or shiftable part of the connections vertically in either direction, the parts in connection with the yoke or shiftable part being thereby held or locked in their intermediate positions. To effect the lateral movement of the yoke D for the purpose of effecting the engagement of one rack or the other with the pinion C', according to the direction of movement desired, a hand-lever E may be provided and connected with the yoke by a link $e$, which straddles the sleeve C, the free vertical movement of the yoke being permitted through a pin-and-slot connection, (indicated at $e'$.) It will be observed that through the formation of the slot $d$, which engages the sleeve C, no lateral movement of the yoke, and consequently no movement of the lever E, can take place except when the yoke is in its middle position, considered with reference to its vertical movement, and when the parts connected therewith are in their middle position or, more especially, when the clutch which is operated by the movement of the yoke is opened, and that at such time the clutch is held securely locked in its open position. The particular object in view in effecting such a relation between the parts is to prevent a possibility of shifting the speed-changing or reversing gear except when the clutch is open, as will appear more clearly hereinafter. Furthermore, it will be seen that the use of the shiftable member D, which is a modified form of mangle-rack, secures an interlocking of the controlling mechanism, which has marked advantages. It provides for securely holding the interengaged members without the use of small parts—such as cams, trips, or keys— which in other mechanisms constantly wear and frequently become dislocated and fail to act, so that the entire mechanism becomes useless.

The connection from the yoke D to the backing-off and going-ahead clutches—that is, to the direction or reversing mechanism which determines the direction of movement—may be effected in any convenient manner. As shown in the drawings, (see particularly Figs. 1, 2, and 6,) the yoke is connected to one arm of a bell-crank lever F, to the other arm of which is connected by a link $f$ a slide F', having a double cam-slot $f'$. Since the clutches or clutch members in the particular construction under consideration are intended to provide for a reversal of the vehicle, one being a going-ahead clutch and the other a backing-clutch and both power-clutches, separate clutch-rods $F^2$ are provided for the several clutches or clutch members, each of which is of ordinary construction, as indicated at $F^3$ in Fig. 6, where the two clutches are shown at opposite ends of the shaft, and need not be further described herein. In the middle position of the yoke D neither of the clutch members is in operative engagement; but a movement of the yoke vertically in one way or the other brings the corresponding clutch member into engagement for going ahead or backing, as may be desired.

As above indicated, the speed-changing mechanism is interlocked with the clutch-controlling mechanism, so that the speed-changing gear cannot be shifted except when the clutch is open. The devices for controlling the speed-changing gear and the speed-changing gear itself may be constructed and arranged in any convenient manner. As represented in the drawings, (see particularly Figs. 1, 2, and 6,) a hand-lever G is mounted on the body of the vehicle in proximity to the yoke-lever E and is connected by link $g$ with a rack G'. The latter through a double pinion $g'$ shifts the rack-toothed driving-shaft H, which is longitudinally movable, so as to bring a key $h$ thereon into engagement with one or another of the concentric driving-pinions H', which mesh with corresponding driving-gears $H^2$ on the main shaft or axle K. Through the operation, therefore, of the reciprocating members F' and G' the clutching and speed-changing devices are actuated; but, as will now be explained, interlocking means are provided whereby only one of these reciprocating members can be moved at a time.

The interlocking of the clutch-operating devices and the devices for controlling the speed-changing gear is conveniently effected through the proximity of the levers E and G, it being remembered that the lever E is always in a determined position intermediate between the extremes of its throw when the clutch is open. Accordingly the two levers pass through a slotted guide-plate L, and between them is mounted a latch or pivoted locking-plate L', which is pressed normally toward the lever E by a spring $l$. On the side adjacent to the lever E the latch L' is provided with a notch $l'$, which is so located as to register with the lever E when the latter is in its intermediate position, whereby the latch is then drawn over by the spring $l$. On the other side the latch is provided with notches $l^2$, which correspond to the three positions of the speed-changing lever G. It will now be evident that when the lever E is in its intermediate position—that is to say, when the clutch is open—the latch L' releases the lever G, so that it can be shifted to any desired position, but that when the lever E is in its forward position, closing the clutch for going ahead, or in its rearward position, closing the clutch for backing, the latch L' is held over toward the lever G, so that the latter cannot be moved. It will also be observed that the lever E forms what may properly be called a "selective" means for determining in what position the several mechanisms will be used. The position of this lever not only determines the direction of the vehicle, but also locks the driving mechanism for the selected speed, for the hand-lever G, which operates the speed-changing gear, is always locked in one of its several positions whenever the selective mechanism E is moved out of its normal position midway of the extremes of its throw. Furthermore, it will be evident that the speed-changing gear must be in one of its several operative positions, as distinguished from a condition of change, before the lever E can be moved into its go-ahead or reverse position from its intermediate position.

A steering-handle M is supported in proper position for operation by the driver and is connected by suitable mechanism, not necessary to be described, with the steering-wheels.

It will be obvious that various changes can be made in construction and arrangement, according to the requirements of the particular use for which the vehicle is intended, without departing from the spirit of the invention. Thus if the driving mechanism of the vehicle were arranged to give different speeds for going ahead, but only one speed for backing, considerable simplification of the controlling and actuating devices might be effected, although they would still be so related as to accomplish the general results in view. Furthermore, should the vehicle be manipulated by a very careful and skilled driver the interlocking mechanism of the clutch and speed-changing gear might be dispensed with if it should be considered desirable to further simplify the connections. Such modification, however, would still include the prime features of releasing the clutch when setting the brake and so disposing the controlling and guiding levers or handles that no foot or hand of the driver will have more than one lever or handle to manage. Other modifications, an obvious reversal of the relation of some of the coacting parts, as well as substitutions of equivalent mechanical devices, will also suggest themselves.

I claim as my invention—

1. In a motor-vehicle, the combination with power-transmitting devices, of controlling mechanism therefor, said controlling mechanism including a mangle-rack with oppositely-disposed teeth, a coacting gear, means to hold said gear in engagement with the teeth on one side or the other of said rack except when said gear is in its middle position and means for effecting engagement of said gear with the teeth on one side or the other of the rack when said gear is in its middle position.

2. In a motor-vehicle, the combination with power-transmitting devices, of controlling mechanism therefor, said controlling mechanism including a mangle-rack supported for reciprocating and transverse movement, a coacting gear and a plate mounted in operative relation with said rack and provided with an offset opening in operative relation with said gear, whereby a transverse movement of the rack must accompany a complete reciprocation thereof.

3. In a motor-vehicle, the combination with power-transmitting devices, controlling mechanism therefor, said controlling mechanism including operating connections, a shiftable actuating member supported with relation to the operating connections for reciprocating movement and a transverse movement between the limits of its reciprocating movement, and means whereby a transverse movement thereof must accompany a complete reciprocation thereof.

4. In a motor-vehicle, the combination with power-transmitting devices, of controlling mechanism therefor, said controlling mechanism including a rotary member, with a reciprocating member adapted for operative engagement with the rotary member, and means for effecting relative transverse movement of the reciprocating member and the rotary member at a predetermined point in the longitudinal movement thereof to control the engagement of said members.

5. In a motor-vehicle, the combination with power-transmitting devices, of controlling mechanism therefor, said controlling mechanism including a reciprocating member, a rotary member adapted for operative engagement with said reciprocating member and for locking engagement therewith, means for reciprocating the first-named member, and means for effecting relative transverse movement of said members to unlock the same.

6. In a motor-vehicle, the combination of go-ahead and reversing mechanisms, actuating devices for said mechanisms, selective means to determine the connections of said mechanisms with said actuating devices, and a handle independent of said selective means and intermediate devices to control the movement of said selective means.

7. In a motor-vehicle, the combination of go-ahead and reversing mechanisms, actuating devices or connections for each of said mechanisms, a common lever for operating said devices and independently-operable selective means interposed between said lever and actuating devices, whereby a shifting of said selective means permits the go ahead or reversing of the vehicle by a like movement of said lever.

8. In a motor-vehicle, the combination of speed-varying mechanism and vehicle-controlling mechanism, said vehicle-controlling mechanism including a lever, a reciprocating member connected therewith, interlocking means in operative relation with said reciprocating member and the speed-varying mechanism, whereby said speed-varying mechanism cannot be shifted except the lever be returned to its initial or middle position.

9. In a motor-vehicle, the combination of speed-varying mechanism, and vehicle-controlling mechanism, said mechanisms including a plurality of reciprocating members, means for moving any of the reciprocating members, interlocking means whereby only one of said reciprocating members can be moved at a time, and shifting connections between one of said reciprocating members and the speed-varying mechanism.

10. In a motor-vehicle, the combination of speed-varying mechanism, and vehicle-controlling mechanism, said mechanisms including a plurality of reciprocating members, and interconnecting means between the reciprocating members whereby upon movement of one of said reciprocating members the others are locked against movement.

11. In a controlling system for motor-vehicles, a plurality of reciprocating members, driving connections controlled by said reciprocating members, and interlocking means intermediate said reciprocating members whereby the movement of any of the reciprocating members locks the other members from movement.

12. In a motor-vehicle, the combination of speed-controlling mechanism, a handle and connections for said speed-controlling mechanism, go-ahead and reversing mechanisms, actuating devices for said last-named mechanisms, selective means for determining the connection of said last-named mechanisms with said actuating devices, and interlocking devices between said selective means and the handle and connections for the speed-controlling mechanism.

13. In a motor-vehicle, the combination of a clutch between the motor and the driving-wheels, clutch-operating mechanism, brake mechanism and interlocking connections between said clutch-operating mechanism and said brake mechanism, said interlocking connections operative in one direction only.

14. In a motor-vehicle, the combination of a clutch between the motor and driving-wheels, clutch-operating mechanism, brake mechanism and connections between said mechanisms whereby the former is actuated simultaneously with the latter and the latter is not operated by the actuation of the former.

15. In a motor-vehicle, the combination of power-disconnecting means, braking means, actuating mechanism for each of said means, and connections whereby one of said means is actuated upon a predetermined movement of the actuating mechanism of the other.

16. In a motor-vehicle, the combination of a clutch between the motor and driving-wheels, clutch-operating mechanism, brake-actuating mechanism, and connections carried by the brake-actuating mechanism and having a positive engagement with the clutch-operating mechanism in one direction of movement to effect the simultaneous movement of the clutch-operating mechanism with the brake-actuating mechanism, such clutch-operating mechanism being free for movement independently of the brake-actuating mechanism.

17. In a motor-vehicle, the combination of a clutch between the motor and the driving-wheels, clutch-operating mechanism, speed-changing gear, mechanism for actuating said speed-changing gear and interlocking connections between said mechanisms whereby the movement of one mechanism is dependent upon the movement of the other mechanism.

18. In a motor-vehicle, speed-varying mechanism power-disconnecting mechanism and interlocking means between said speed-varying and power-disconnecting mechanism whereby the speed-varying mechanism cannot be actuated except upon the disconnecting of the power.

19. In a motor-vehicle, the combination of a clutch between the motor and the driving-wheels, clutch-operating mechanism, speed-changing mechanism between the motor and the driving-wheels, reversing mechanism, actuating devices for the several mechanisms and connections in operative relation with said clutch, whereby said several mechanisms are locked against movement except when the clutch is open.

20. In a motor-vehicle, the combination of a clutch between the motor and the driving-wheels, clutch-operating mechanism, speed-changing mechanism, brake mechanism, connections between the brake mechanism and the clutch-operating mechanism to effect simultaneous movement of the latter with the former, and interlocking connections between the clutch-operating mechanism and the speed-changing mechanism to lock the latter against movement when the clutch is closed.

21. In a motor-vehicle, the combination of power-clutch mechanism, speed-changing and reversing mechanism, brake mechanism, means for operating said mechanisms including two pedal-levers, and interlocking means between the power-clutch-operating mechanism and the brake-operating lever, substantially as described.

22. In a motor-vehicle, the combination of a clutch between the motor and the driving-wheels, clutch-operating mechanism including a lever, brake mechanism including a lever, speed-changing mechanism, and interconnected mechanism between said levers, substantially as described.

23. In a motor-vehicle, the combination of a clutch between the motor and the driving-wheels, means for operating said clutch including a pedal, brake mechanism adapted to retard the movement of the vehicle, means for operating said mechanism including a pedal, and interlocking mechanism between said pedals operative only when said brake-pedal is moved, substantially as described.

24. In a motor-vehicle, the combination of brake mechanism, a power-clutch and speed-changing gear, separate operating levers or handles and connections for each of said mechanisms, interlocking devices between the brake-operating connections and the power-clutch-operating connections and interlocking devices between the power-clutch-operating connections and the speed-changing connection, substantially as shown and described.

25. In a motor-vehicle, the combination of brake mechanism, reversing mechanism and speed-changing gear, separate operating levers or handles and connections for each of said mechanisms and gear-interlocking devices between the brake-operating connections and the reversing-mechanism connections, and interlocking connections between the reversing-mechanism connections and the speed-changing connections, substantially as shown and described.

26. In a motor-vehicle, the combination of power and reversing clutches, an operating lever or handle, and connections for bringing one or the other of said clutches into operation, said connections including a shiftable part to determine the operation of one or the other of said clutches and preventing movement of said connections in one position, and a lever or handle and connections to control said shiftable part, substantially as shown and described.

27. In a motor-vehicle, a power-driven shaft, two connecting and disconnecting devices between the motor and said shaft, means for positively locking one of said connecting and disconnecting means in engagement with said shaft while the other is out of engagement with said shaft, speed-varying mechanism, and interlocking connections between said speed-varying mechanism and said connecting and disconnecting means.

28. In a motor-vehicle, the combination of power and reversing clutches, an operating lever or handle and connections for bringing one or the other of said clutches into operation, said connections including a shiftable part to determine the operation of one or the other of said clutches, a lever or handle to control said shiftable part, speed-changing gear, a lever or handle and connections to operate said speed-changing gear, and interlocking devices between the two last-named levers or handles, substantially as shown and described.

29. In a motor-vehicle, the combination of a power-clutch, reversing mechanism, speed-changing gear and brake mechanism, two pedal-levers and two hand-levers connected severally with said mechanisms and gear to operate the same, interlocking devices between said hand-levers, and interlocking devices between the reversing hand-lever and the power-clutch-controlling pedal, substantially as shown and described.

30. In a motor-vehicle, the combination with reversing mechanism, and speed-changing gear, of operating-levers for said mechanism and gear respectively, said levers being located in proximity to each other, and interlocking devices between said levers, substantially as shown and described.

31. In a motor-vehicle, the combination of a double clutch and reversing-gear between the motor and the driving-wheels, a double rack connected with said double clutch and reversing-gear and adapted by its movement in either direction to close the clutch for going ahead or backing, a pinion connected to the clutch-operating lever to be rotated thereby in one direction, and means for shifting said double rack to bring one side or the other into engagement with the pinion, substantially as shown and described.

32. In a motor-vehicle, the combination of a double clutch and reversing-gear between the motor and the driving-wheels, a double rack connected with said double clutch and reversing-gear and adapted by its movement in either direction to close the clutch for going ahead or backing, a pinion connected to the clutch-operating lever to be rotated thereby in one direction, means for shifting said double rack to bring one side or the other into engagement with the pinion, and a plate secured to said double rack and having a slot with narrow end portions and a wide middle portion to engage the shaft of said pinion, whereby the rack can be shifted to bring one side or the other into engagement with the pinion only when the rack is in its middle position, when both sides of the clutch are open, substantially as shown and described.

33. In a motor-vehicle, the combination of a clutch between the motor and the driving-wheels, a clutch-operating mechanism including a lever, speed-changing mechanism including a lever adjacent to the first-named lever, and an interlocking device coöperating with both of said levers whereby the speed-changing lever can be operated only when the first-named lever is in its initial position and the clutch is open, substantially as shown and described.

34. In a motor-vehicle, the combination of a clutch between the motor and the driving-wheels, clutch-operating mechanism including a lever, speed-changing mechanism including a lever adjacent to the first-named lever, and a pivoted latch between said levers having on one side notches to correspond with the several positions of the speed-changing lever and on the other side a single notch to correspond with the initial position of the clutch-lever, whereby said latch can release the speed-changing lever only when the clutch-lever is in its initial position, substantially as shown and described.

35. In a motor-vehicle, the combination of a clutch between the motor and the driving-wheels, clutch-operating mechanism, speed-changing mechanism, and an interlocking device coöperating with said mechanisms whereby the clutch can be applied only when the speed-changing mechanism is locked in driving position.

This specification signed and witnessed this 24th day of October, A. D. 1899.

HERBERT VANDERBEEK.

In presence of—
M. L. CLARK,
HERMANN F. CUNTZ.